United States Patent [19]

Mennicke et al.

[11] Patent Number: 4,767,685

[45] Date of Patent: Aug. 30, 1988

[54] ELECTROCHEMICAL STORAGE CELL

[75] Inventors: Stefan Mennicke, Leimen; Karl Reiss, Mülhausen-Rettigheim, both of Fed. Rep. of Germany

[73] Assignee: Brown, Boveri & Cie Aktiengesellschaft, Mannheim, Fed. Rep. of Germany

[21] Appl. No.: 56,337

[22] Filed: May 22, 1987

Related U.S. Application Data

[63] Continuation of Ser. No. 836,087, Mar. 4, 1986, abandoned.

[30] Foreign Application Priority Data

Mar. 5, 1985 [DE] Fed. Rep. of Germany ....... 3507697

[51] Int. Cl.[4] ............................................. H01M 4/36
[52] U.S. Cl. .................................... 429/104; 424/209
[58] Field of Search ................................ 429/104, 209

[56] References Cited

U.S. PATENT DOCUMENTS

| | | | |
|---|---|---|---|
| 4,160,069 | 7/1979 | Johnson et al. | 429/104 |
| 4,184,013 | 1/1980 | Weddigen et al. | 429/104 |
| 4,248,943 | 2/1981 | Ludwig et al. | 429/104 |
| 4,555,846 | 12/1985 | Mennicke et al. | 429/104 X |

Primary Examiner—Brian E. Hearn
Assistant Examiner—Stephen J. Kalafut
Attorney, Agent, or Firm—Herbert L. Lerner; Laurence A. Greenberg

[57] ABSTRACT

Electrochemical storage cell based on sodium and sulfur with an anode space and a cathode space which are separated from each other by a solid electrolyte and are bounded at least in some places by a metallic housing, and a sulfur electrode formed of a fiber-like material impregnated with sulfur arranged within the cathode space. An auxiliary substance which decomposes during charging of the cell to produce ternary sodium sulfide is arranged in the cathode space at least in the boundary regions between the solid electrolyte and the sulfur electrode.

1 Claim, 1 Drawing Sheet

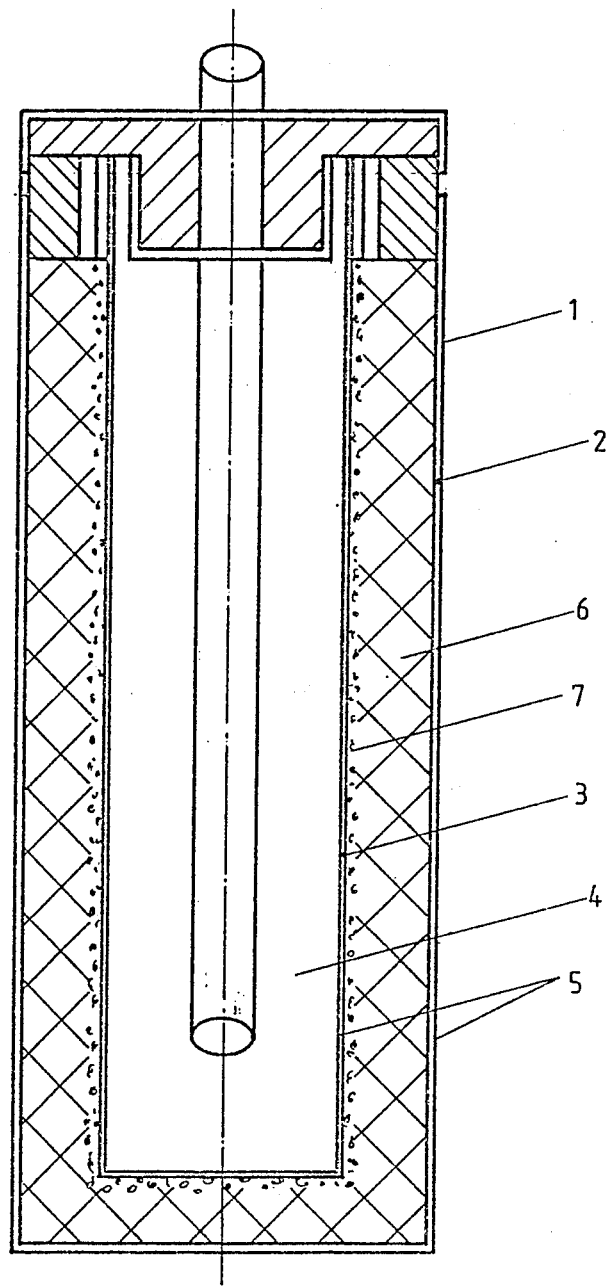

4,767,685

ELECTROCHEMICAL STORAGE CELL

This application is a continuation, of application Ser. No. 836,087, filed Mar. 4, 1986, now abandoned.

BACKGROUND OF THE INVENTION

1. Field of the Invention

The invention relates to an electrochemical storage cell based on sodium and sulfur with an anode space and a cathode space which are separated from each other by a solid electrolyte and are bounded at least in some places by a metallic housing, and a fiber-like material impregnated with sulfur arranged within the cathode space.

2. Description of the Prior Art

Such electrochemical storage cells are highly suitable as energy sources. To an increasing degree they find use in the construction of storage batteries to provide the power supply of electric vehicles.

A specific example of these storage cells are those which operate on the basis of sodium and sulfur, are rechargeable and have a solid electrolyte of beta-aluminum oxide which separates the anode space from the cathode space. One advantage of these storage cells is that there are no electrochemical secondary reactions. The reason for this is that only sodium ions can get through the solid electrolyte. The current yield of such sodium/sulfur storage cells is therefore near 100 percent. In these electrochemical storage cells, the ratio of energy content to the total weight of the storage cell is very high as compared to lead storage batteries since the reactants are light and much energy is released in the electrochemical reactions.

The sulfur electrode which is formed by a fiber-like material of carbon or graphite and is impregnated with sulfur is within the cathode space. A disadvantage of these storage cells with such a sulfur electrode is that they are only moderately rechargeable since during the charging of the storage cells, liquid sulfur is formed which is deposited on the solid electrolyte and blocks further charging of the storage cell because the sulfur is nonconductive.

German Pat. No. 26 49 660 discloses a storage cell of the sodium and sulfur type, in which blocking of the electrode is prevented by a layer, arranged in the vicinity of the solid electrolyte, which layer is preferentially wetted by sodium polysulfide. The effectiveness of the layer depends on the nature of its surface. The latter is brought about by subjecting the layer to a pretreatment before it is arranged in the cathode space. However, the effectiveness of such a layer diminishes with increasing age of the storage cell. In particular, the effect of the layer is reduced by absorption of impurities from the sodium-polysulfide melt, for instance, of corrosion products and oxidation products such as are produced with advancing age in the storage cell. Surface reactions with the sodium polysulfide and the segregation of impurities from the solid electrolyte additionally reduce the surface effectiveness of such a layer. In other storage cells, the rechargeability is improved by the provision that materials which influence the properties of the sulfur in a positive manner are additionally filled into the cathode space. However, here to, there are disadvantages. Thus, for instance, storage cells, into the cathode space of which tetracyanoethylene is added, exhibit a rapid drop in capacity with increasing age, particularly when they begin to leak. A further disadvantage of such additives is that most of them are poisonous and, in addition, expensive. They cause difficulties in the recovery of failed storage cells because they cannot be separated readily from the sodium polysulfide. In addition, a corrosion-promoting effect within the storage cell is observed with some additives, particularly with arsenic fluoride and tetracyanoethylene.

SUMMARY OF THE INVENTION

It is therefore an object of the invention to provide a storage cell, in the cathode space of which a sulfur electrode is arranged, the rechargeability of which is promoted by the thermodynamic properties of the volume phase of an auxiliary substance.

With the foregoing and other objects in view, there is provided in accordance with the invention an electrochemical storage cell based on sodium and sulfur with an anode space and a cathode space which are separated from each other by a solid electrolyte and are bounded, at least in some places, by a metallic housing, a sulfur electrode formed of a fiber-like material impregnated with sulfur arranged within the cathode space, the improvement comprising disposing an auxiliary substance containing sodium, a heavy metal and sulfur in the cathode space in the boundary regions between the solid electrolyte and the sulfur electrode, said auxiliary substance characterized by the property when disposed in the cathode space of decomposing during charging of the cell into a ternary sodium sulfide and a heavy metal sulfide, and during the discharging of the cell the reverse reaction of ternary sodium sulfide and heavy metal sulfide takes place to form the auxiliary substance.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates an electrochemical storage cell having a cup-shaped outer metallic housing within which is disposed a cup-shaped solid electrolyte which contains sodium. The coherent space between the solid electrolyte and the housing is the cathode space and contains a sulfur electrode formed of fiber-like material with a carbon or graphite base and saturated with sulfur. An auxiliary substance to promote rechargeability of the storage cell is applied to the surface of the fiber-like material in the region adjoining the solid electrolyte.

DESCRIPTION OF THE PREFERRED EMBODIMENTS

The auxiliary substance arranged in the cathode space according to the invention is largely insoluble in water, ethanol, and liquid polysulfides at the operating temperature of the sodium/sulfur storage cell. Thereby, an opportunity is provided to arrange the auxiliary substance in a targeted manner where the electrochemical reaction rates in the cathode space are highest. This is the case particularly at the boundary surfaces between the sulfur electrode and the solid electrolyte. If the situation requires, the auxiliary substance can also be applied to the entire surface of the sulfur electrode. This is done by sprinkling-on the auxiliary substance in the form of powder. The auxiliary substance can also be applied by vapor deposition, sputtering, CVD methods or by synthesis to the fiber-like electron-conducting material which forms the sulfur electrode.

The auxiliary substance is a chemical compound which contains an alkali metal, a heavy metal and a chalcogen. Preferably, the heavy metal is from the sixth secondary group of the periodic system of the elements and the preferred chalcogen is sulfur. The auxiliary substance is characterized by the property when disposed in a cathode space of an electrochemical storage cell based on sodium and sulfur of decomposing during charging of the cell into a ternary alkali chalcogen, specifically a ternary sodium sulfide and a heavy metal compound, as for example, chromium sulfide, and during the discharging of the cell the reverse reaction takes place. The auxiliary substance consists preferably of sodium thiochromate-III ($NaCrS_2$).

The invention will be explained in the following with the aid of the drawing.

In the drawing, an electrochemical storage cell 1 is shown which works on the basis of sodium and sulfur. The storage cell 1 is bounded toward the outside by a metallic housing 2 which is cup-shaped. A corrosion-resistant layer (not shown here) which protects the housing against aggressive materials and their reaction is applied to the inside surfaces of the housing 2. A solid electrolyte 3, similarly cup-shaped and made of beta-aluminum oxide, is arranged inside the housing 2. The interior of the solid electrolyte 3 serves as the anode space 4. The dimensions of the solid electrolyte 3 are chosen to provide between its outside surfaces and the inside surfaces of the metallic housing 2, a coherent space 5 which serves as the cathode space. The sulfur electrode 6 is arranged within the cathode space. The sulfur electrode is formed by a fiber-like material with a carbon or graphite base. The fiber-like material is saturated with sulfur. In the storage cell 1 according to the invention, an auxiliary substance 7 is applied to the surface of this fiber-like material and in particular to the surface of the sulfur electrode 6 which faces the solid electrolyte 3 and adjoins the latter flush. The auxiliary substance 7 has the property of promoting the rechargeability of the storage cell. In the embodiment of the storage cell 1 shown, this auxiliary substance 7 is applied to the sulfur electrode 6 only in the region adjoining the solid electrolyte 3. In this border region, the chemical reactions proceed at the fastest rate so that it is especially important that the formation of liquid sulfur be prevented there during the recharging of the storage cell. In some cases it may be useful to apply this auxiliary substance 7 to the entire surface of the sulfur electrode 6. The auxiliary substance 7 according to the invention is formed by a ternary sodium sulfide and contains a heavy metal as the further metallic element which, as shown here, is chromium. Preferably, the auxiliary substance is sodium thiochromate-III ($NaCrS_2$). Another chemical compound which has the above-mentioned composition, except it contains another heavy metal instead of chromium, can be used as the auxiliary substance 7, of course, if it improves the rechargeability of the storage cell in the same manner and has no detrimental secondary effects. The auxiliary substance 7 according to the invention is produced as a powder and is sprinkled on the surface of the fiber-like material forming the sulfur electrode 6. The auxiliary substance 7 may also be applied to the fiber-like electron-conducting material of the sulfur electrode 6 by vapor deposition, sputtering or a CVD method, or by synthesis. The auxiliary substance 7 in the form of sodium thiochromate-III according to the invention, is formed by melting a mixture of chromium, sodium carbonate and sulfur at 700° C. The material is subsequently dried at 400° C. in a vacuum. The action of the auxiliary substance 7 according to the invention will be explained in the following. During the operation of the storage cell 1 at a temperature around 350° C., the sodium thiochromate is decomposed in the charging process of the storage cell 1 into sodium sulfide and chromium sulfide. When the storage cell 1 is discharged, the reverse reaction takes place, i.e sodium thiochromate is formed again. The chemical reactions proceeding during the charging and discharging of the storage cell 1 are shown by the following equation:

$$2\ NaCrS_2 \rightarrow Na_2S + Cr_2S_3.$$

The course of the chemical reaction is controlled by the charging state of the storage cell 1, since the former determines the sodium sulfide activity in the polysulfide solution. To ensure the charging of the storage cell 1, it is not necessary to decompose large quantities of sodium thiochromate-III. Rather, it is sufficient to decompose small amounts of the auxiliary substance 7 in those places at which the $Na_2S_x$ phase is interrupted and therefore, a smaller $Na_2S$ activity and a relatively high potential prevail in order to create a $Na_2S_x$ phase again and thus to make a flow of current possible. During the discharging of the storage cell 1, the chromium sulfide ($Cr_2S_3$) formed during the charging reacts with polysulfide to form $NaCrS_2$. According to the invention, it is possible to influence the ternary sodium sulfides by doping as to their electron and ion conductivity and the thereby improve the function of the sulfur electrode 6 and, in particular, the rechargeability of the storag cell 1.

The foregoing is a description corresponding, in substance, to German application No. P 35 07 697.6, dated Mar. 5, 1985, international priority of which is being claimed for the instant application and which is hereby made part of this application. Any material discrepancies between the foregoing specification and the specification of the aforementioned corresponding German application are to be resolved in favor of the latter.

There is claimed:

1. Electrochemical storage cell based on sodium and sulfur with an anode space and a cathode space which are separated from each other by a solid electrolyte and are bounded, at least in some places, by a metallic housing, a sulfur electrode formed of a fiber-like material impregnated with sulfur arranged within the cathode space, the improvement comprising an auxiliary substance which is sodium thiochromate-III disposed in the cathode space and applied to the entire surface of the sulfur electrode directly adjoining the solid electrolyte, said sodium thiochromate-III produced as a powder formed by melting a mixture of chromium, sodium carbonate and sulfur at 700° C. is sprinkled-on or applied to the surface of the fiber-like material of the sulfur electrode by vapor deposition, sputtering or CVD method in the region adjoining the solid electrolyte, said auxiliary substance is characterized by the property when disposed in the cathode space of decomposing during charging of the cell into sodium sulfide and a chromium sulfide, and during the discharging of the cell the reverse reaction takes place to form said auxiliary substance.

* * * * *